United States Patent
Pattarini

[11] 3,815,444
[45] June 11, 1974

[54] FLUID COUPLING GEAR AND SPEED VARIATOR UNIT

[75] Inventor: Giovanni Pattarini, Saronno, Italy

[73] Assignee: Fabbrica Automobile Isotta Fraschini e Motori Breda S.p.A., Milan, Italy

[22] Filed: June 5, 1972

[21] Appl. No.: 260,005

Related U.S. Application Data
[63] Continuation of Ser. No. 74,948, Sept. 24, 1970, abandoned.

[30] Foreign Application Priority Data
Feb. 23, 1970    Italy.................................. 20992/70

[52] U.S. Cl......................... 74/732, 74/718, 74/801
[51] Int. Cl......................... F16h 47/00, F16h 1/28
[58] Field of Search................. 74/732, 801, 718

[56] References Cited
UNITED STATES PATENTS

| | | |
|---|---|---|
| 2,441,490 | 5/1948 | Jandasek............................... 74/732 |
| 2,559,922 | 7/1951 | Alspaugh............................. 74/732 |
| 2,625,056 | 1/1953 | Kelley.................................. 74/732 |
| 3,424,035 | 1/1969 | Heidrich.............................. 74/801 |
| 3,425,301 | 2/1969 | Shannon............................. 74/801 |
| 3,473,416 | 10/1969 | Pope et al............................ 74/801 |

Primary Examiner—Arthur T. McKeon
Attorney, Agent, or Firm—Norman S. Blodgett; Gerry A. Blodgett

[57] ABSTRACT

A fluid coupling having annular primary and secondary coupling elements in a fixed housing wherein a rotatably mounted annular shroud in the fixed housing surrounds the primary and secondary coupling elements enabling through planetary gearing one or two speed upshift.

4 Claims, 4 Drawing Figures

FLUID COUPLING GEAR AND SPEED VARIATOR UNIT

This is a continuation, division, of application Ser. No. 74,948 filed 24 Sept. 70, now abandoned.

This invention relates to an fluid coupling gear/speed variator unit, particularly for epycycloidal type of multipliers, purposely designed for carrying out the control and regulation for high speed boiler supply pumps or generally any operating machines.

The fluid coupling gear/speed variator unit according to the invention, wherein the fluid coupling gear is of the sliding type as controlled by a metering tube and comprising a primary rotating element which may be coupled to and de-coupled from a secondary rotating element, and wherein the speed variator is of the epicycloidal type, is characterized in that the secondary rotating element in the fluid coupling gear is directly connected to and supported by the inlet shaft for said speed variator. The advantages ensuing from said fluid coupling gear/speed variator unit according to the invention are substantial, and particularly it is of a simple construction and structural compactness along with a long life in use. This will allow those parts subjected to wear to be readily dismantled since the speed variator is on line with the fluid coupling gear.

The speed variator is directly driven by the secondary shaft or by the secondary rotating element in the fluid coupling gear, so that advantages in unit long life and efficiency are provided, the intermediate coupling members, which are generally the regions of mechanical losses, having been dispensed with. In addition, the assembly position ensures easiness in part replacement.

The fluid coupling gear rotates at the same speed as the prime driving motor and therefore at the base speeds; therefore, a substantial easiness in regulation is provided also at constant torque. The large sizes for the fluid coupling gear resulting therefrom allow the construction of a large-sized metering tube with resulting less losses and lower required response times.

Furthermore, by the construction according to the invention, both manual and automatic control two-speed step-up gear can be installed, the constructive machine simplicity being substantially kept unaltered.

Over the systems having separate coupling gear and step-up gear, this invention has also the advantage of minimizing the overall dimensions, using a single oil reservoir and a single lubrication pump, as well as a simplification in alignment procedure and unit installation.

These and other features of the fluid coupling gear/speed variator unit according to the invention will become more evident in the course of the description which will be given with reference to the accompanying drawings, in which.

Figure 1:
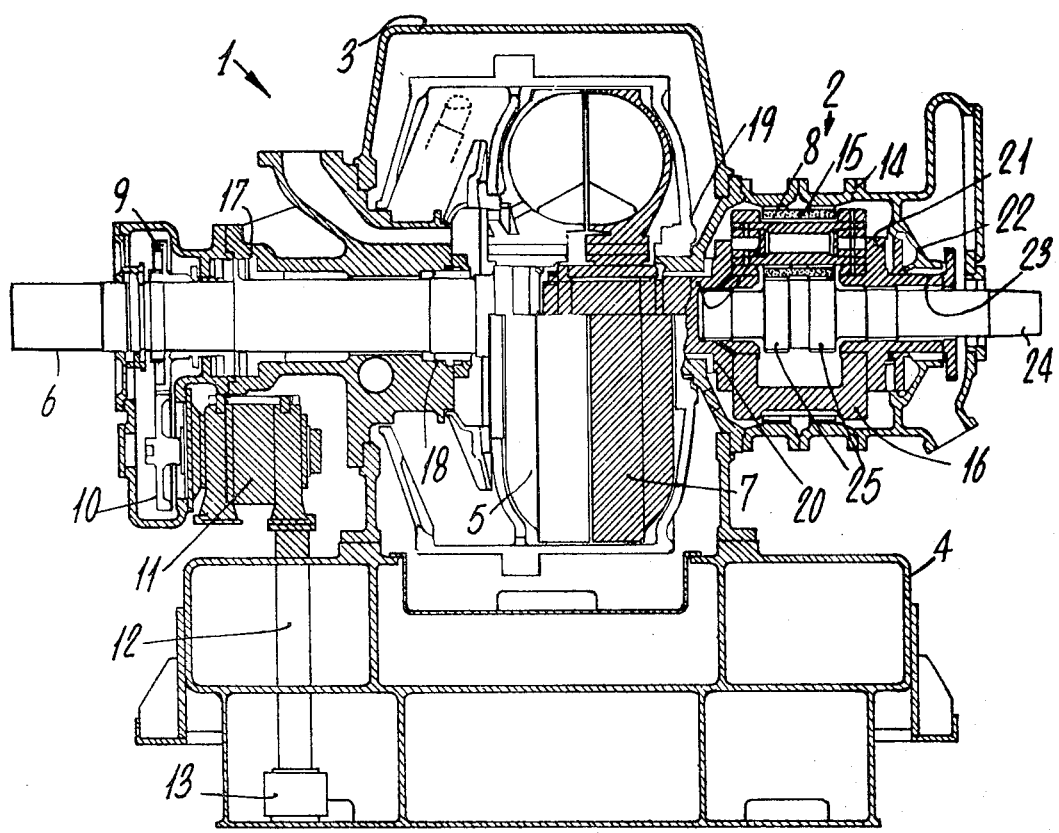
FIG. 1 is a longitudinal sectional view of a single-speed, fluid coupling gear/epicycloidal step-up gear unit having a rotating planetary gear cage.

Referring now to FIG. 1, it will be seen that the fluid coupling gear/speed variator unit substantially comprises an fluid coupling gear unit, designated as a whole at 1, such as of the sliding type controlled by the metering tube, and a speed variator, designated as a whole at 2, of the epicycloidal type directly connected to and on line with said fluid coupling gear 1.

More particularly, the fluid coupling gear 1 of a well known type comprises a supporting structure, the box 3 containing the rotating parts bearing thereon, and below which the entire unit oil reservoir 4 is attached.

The rotating parts for the fluid coupling gear substantially comprise a primary rotating element 5 directly connected with the inlet shaft 6 of the coupling gear which is driven by a suitable prime motor (not shown), and a secondary rotating element 7. The primary rotating element 5 may be coupled to and de-coupled from; in a per se known manner, the secondary rotating element 7 directly supported by the inlet shaft 8 of said speed variator 2. The principle of operation for the above shown fluid coupling gear is already known, whereby it will not be explained hereinafter, not forming a substantial part of the present invention.

By suitable gears 9 and 10, a pump 11 for lubricating oil circulation both within the coupling gear 1 and within the speed variator 2 is also connected to the inlet shaft 6 of the fluid coupling gear 1, the inlet of this pump 11 being connected to the oil reservoir 4 through a suitable tube 12 provided with a filter 13. Similarly, a pump (not shown) of power oil circulation for the fluid coupling gear control is driven by shaft 6.

In the particular embodiment shown in FIG. 1, the speed-variator 2, which is an epicycloidal single-speed step-up gear having a rotating planetary gear cage, comprises a box 14 directly cantilever supported from the box 3 of the fluid coupling gear 1, said box 14 directly forming the feedback element and meshing with the speed variator planetary gears 15 (only one of which shown in FIG. 1) carried by the rotating planetary gear element or cage 16 fast with said speed variator inlet shaft 8. Suitable axial and/or radial bearings 17, 18 and 19 support the primary rotating element of the fluid coupling gear, whereas respective axial and/or radial bearings 20, 21, 22 and 23 support the secondary rotating element of the coupling gear and the speed-variator planetary gear element of cage to the box 14.

Within the planetary gear element of cage 16 and rotating relative thereto, there is the outlet shaft 24 of the speed-variator 2, this shaft 24 having suitable crown gears 25 meshing with the planetary gears 15 for being rotatably driven thereby.

Figure 2:
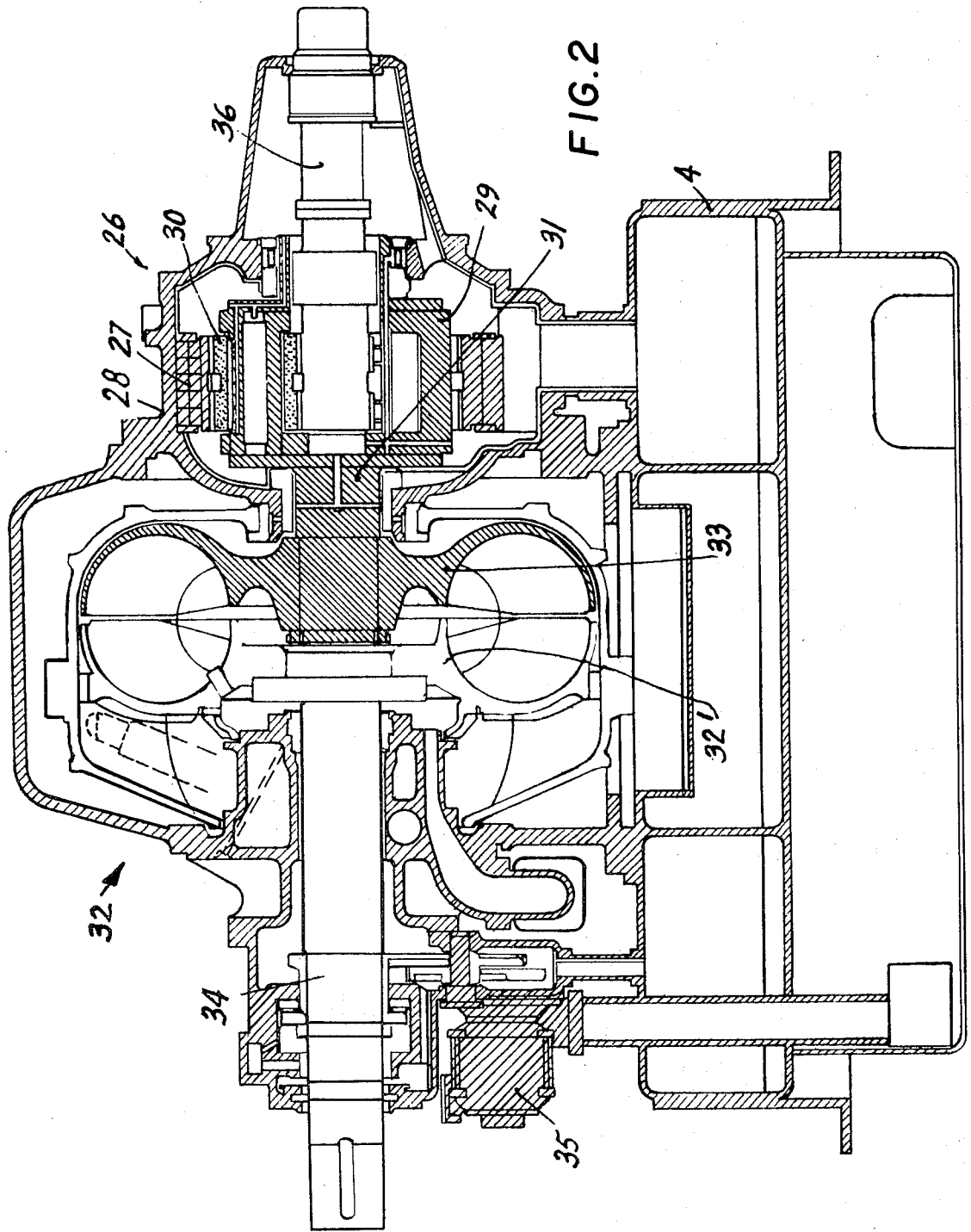
FIG. 2 shows a unit similar to that of FIG. 1, but using a different type of epicycloidal step-up gear.

A similar approach to that of FIG. 1 is shown in FIG. 2, and particularly a unit comprising an fluid coupling gear 32 of the above described character, connected with an epicycloidal speed variator of a different type from the former (designated as a whole at 26,) this speed variator being a single-speed, rotating planetary gear cage over gear. The difference between the unit in FIG. 1 and that in FIG. 2 is only in the type of speed variator being used, and this to show the adaptability of the invention to different types of speed variator to meet with different requirements.

Also in the embodiment of FIG. 2, the speed variator 26 comprises a feedback element 27 attached to the inside of box 28; a planetary gear element or cage 29 carrying planetary gears 30 coupling with said feedback element 27; said planetary gear cage 29 being directly connected to the speed variator inlet shaft 31, carrying the secondary rotating element for the fluid coupling gear designated as a whole at 32. Also in this case, the fluid coupling gear 32 is conventional and substantially comprises a primary rotating element 32' which may be coupled to and de-coupled from the secondary rotating element 33. The primary rotating element 32' is connected to the coupling gear inlet shaft 34 driven by a suitable prime motor, this shaft 34 driving the lubrication pump 35 and the power circuit pump (not shown) of the fluid coupling gear, as in FIG. 1.

Thus, at the outlet shaft 24 (FIG. 1) or at the outlet shaft 36 (FIG. 2) a speed will be provided which is multiplied in relation to the inlet shaft.

Figure 3:
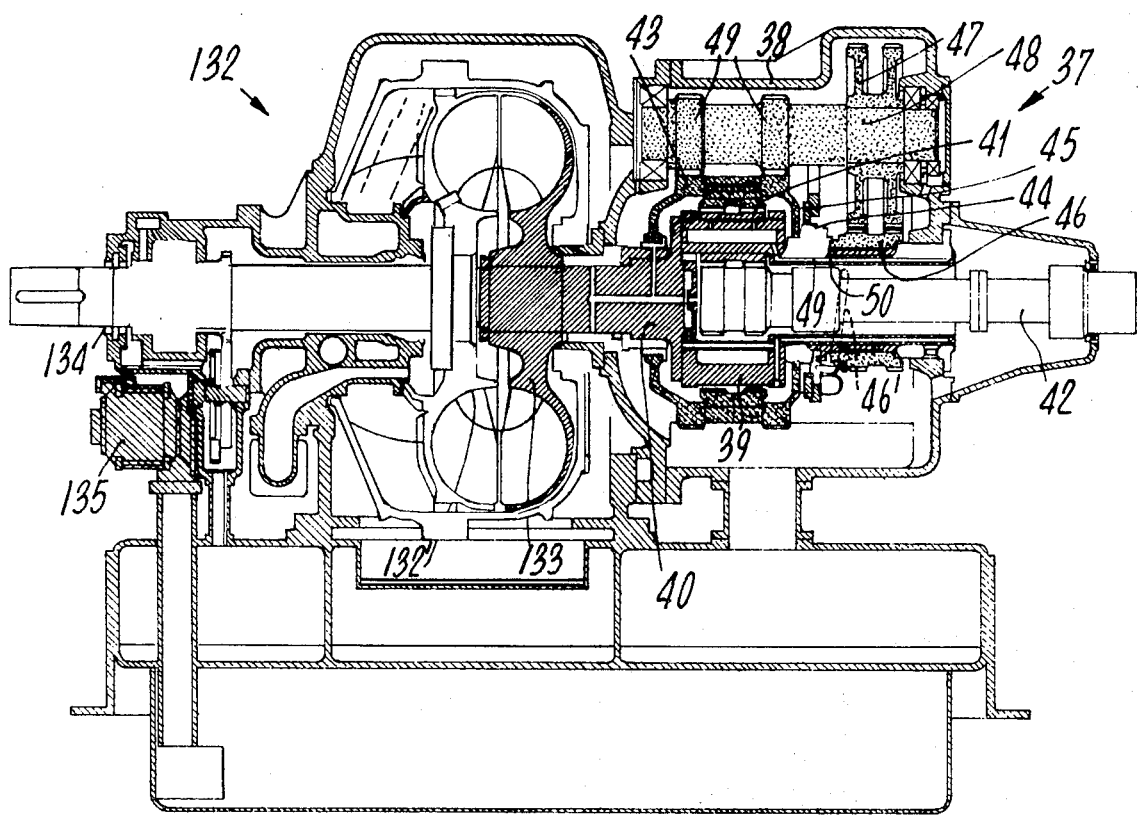
FIG. 3 shows a two-speed, fluid coupling gear/step-up gear unit as provided for manual local and remote control with the machine at a shut down condition.
Figure 4:
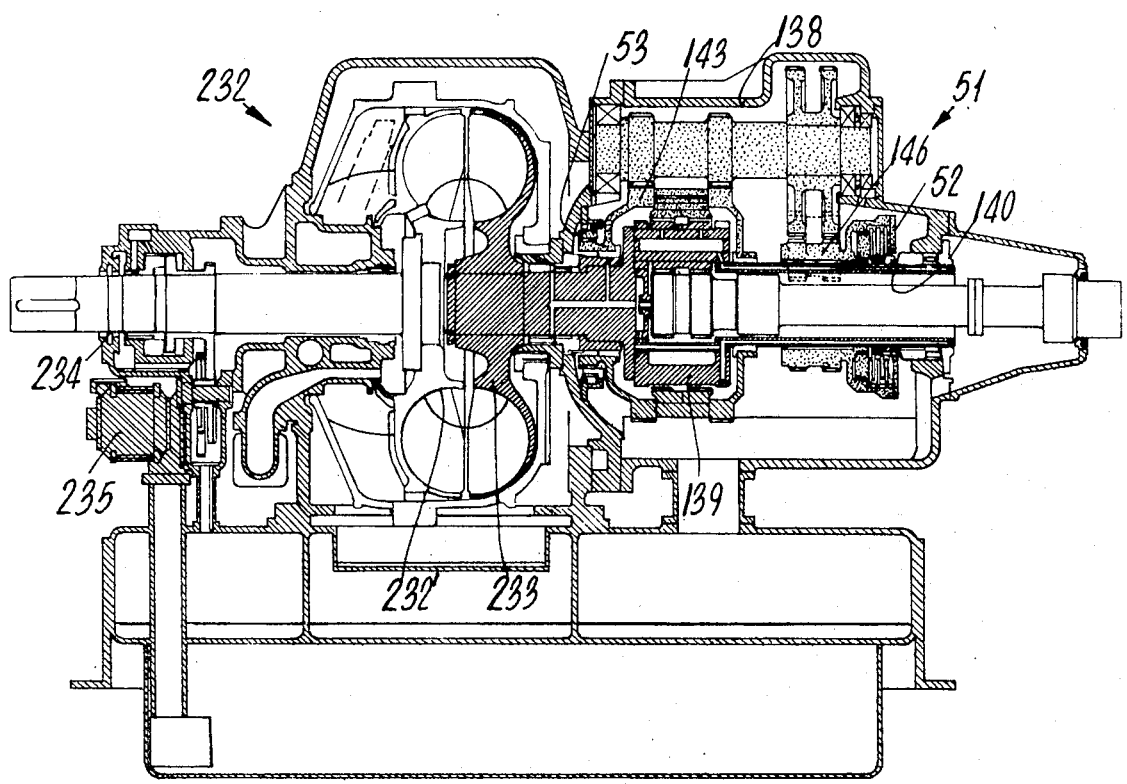
FIG. 4 shows a two speed, fluid coupling gear/step-up gear provided with an automatic control.

In the case of FIGS. 1 and 2, the speed variators 2 and 26, respectively, are single-speed step-up gears. However, it is desirable sometimes to have multi-speed step-up gears. This is shown in FIGS. 3 and 4 of the appended drawings. In these two figures, the fluid coupling gear is the same as that as in FIG. 2, whereby it will not be further described.

Referring now to FIG. 3, it will be seen that the speed variator, designated as a whole at 37, is still of the epicycloidal character, the members for low speed operation being arranged at the top, while those for high speed operation are arranged at the bottom.

The speed variator 37 substantially comprises a stationary box 38, within which the planetary gear cage 39 is located and connected to the shaft 40 carrying the secondary rotating element 133 of the fluid coupling gear 132.

The planetary gear cage 39 is provided with planetary gears 41 (only one of which being shown in FIG. 3) which connect the outlet shaft 42 with a sun ring 43 rotatably carried through suitable bearings from the shaft 40 and planetary gear cage 39 unit. Through the clutch sleeve 44 said ring 43 may be connected to a portion 45 made fast with the speed variator box 38, as shown at the top in FIG. 3, and enables the ring 43 to keep stationary and to form the feedback element for low speed operation. The clutch sleeve 44 may be normally operated by a lever 46', shown in phantom line in the figure, or in any other way, but the connection and disconnection of this sleeve should occur at machine shut down condition.

On the extension of the speed variator inlet shaft 37, and following the planetary gear cage 39, there is a second ring 46 which is provided with a pair of crown gears for meshing with the corresponding gears 47 fast with a countershaft 48 having further crown gears 49 meshing with said ring 43.

The second ring 46 may rotate idly or may be coupled to the planetary gear cage 39 and hence to the shaft 40 by causing the clutch sleeve 44 to slide rightwards, as shown at the bottom in FIG. 3, by actuating said lever 46'. Thus, in this case said clutch sleeve 44 is directly connected between the gear 49 fast with the speed variator inlet shaft 40, and a corresponding crown gear 50 of said ring 46, enabling the latter to rotate and rotatably drive the countershaft 48 thus forming the high speed feedback element.

It has been mentioned that with the fluid coupling gear/speed variator unit shown in FIG. 3, the unit has to be shut down in order to connect or disconnect the second speed or gear. However, it is sometimes desirable to connect or disconnect the second speed or gear as the unit is moving.

This is accomplished by the fluid coupling gear/speed variator unit in FIG. 4, where the step-up gear 51 is fitted with a clutch for connecting and disconnecting the feedback countershaft.

In the embodiment of FIG. 4, the fluid coupling gear 232 and the speed variator 51 are similar to those in FIG. 3, the difference residing in that the variator 51 comprises a clutch 52 connected between the ring 146 and the speed variator entrance portion of shaft 140, which is located downstream of the planetary gear cage 139. In addition, it is provided in this case to use an automatic clutch sleeve, 53 connecting or disconnecting said first ring 143 from the speed variator stationary portion or box 138, and this clutch sleeve 53 has been shown at the top in FIG. 4 as disengaged from the stationary portion 138 for high speed unit operation, whereas at the bottom it has been shown at the position for low speed operation. The connection and disconnection of sleeve 53 are automatic and occur by reaction to the increase or decrease in the rotation speed of said ring 143.

From the foregoing disclosure and as from the appended drawings, it will be thus understood that an fluid coupling gear/speed variator unit has been provided which is of a compact construction, high versatility and enables to solve the problems of speed regulation in any application while allowing a high efficiency of the unit.

What is claimed is:

1. A fluid coupling and step-up gearing system, comprising:
   a. a fixed housing including a fluid reservoir,
   b. an input shaft rotatably mounted in the housing,
   c. an annular primary coupling element fixedly attached to the input shaft,
   d. an intermediate shaft rotatably mounted in the housing coaxially of the input shaft,
   e. an annular secondary coupling element fixedly attached to the intermediate shaft,
   f. an annular shroud rotatably mounted in the housing and surrounding the primary and secondary coupling members,
   g. a planetary gear cage fixedly mounted on the intermediate shaft,
   h. an output shaft rotatably mounted in the housing coaxially of the input shaft, the shaft having a pinion gear engaged by the planetary gear.

2. A system as recited in claim 1, wherein the planetary gear and pinion gear constitute a single-speed epicycloidal step-up gear.

3. A system as recited in claim 1, wherein the planetary gear and pinion gear constitute a two-speed epicycloidal step-up gear, and wherein a control is provided for speed selection.

4. A system as recited in claim 1, wherein the fluid reservoir extends around substantial portions of the other elements to reduce thermal expansion and contraction of the shafts to a minimum.

* * * * *